HORIZONTAL SYNCHRONIZING SYSTEM

Filed Nov. 23, 1953

Inventor:
Clifford S. Hogan
BY Dudley B. Howard,
Attorney.

United States Patent Office 2,742,528

Patented Apr. 17, 1956

2,742,528

HORIZONTAL SYNCHRONIZING SYSTEM

Clifford S. Hogan, Milton, N. J.

Application November 23, 1953, Serial No. 393,905

14 Claims. (Cl. 178—69.5)

The invention relates in general to television systems and has particular reference to the means provided in a television receiver for utilizing the horizontal synchronizing pulses customarily included in the transmitted video signal to synchronize the horizontal sweep of the electron beam in the picture tube with corresponding motion of the electron beam in the transmitter's image dissector camera tube.

Prior to my invention, it has been general practice to employ a horizontal sweep oscillator to control charging and discharging times of the capacitor which furnishes sawtooth voltages for deflecting the picture tube beam horizontally. The horizontal synchronizing pulses that are separated from the incoming video signal and which have the required 15,750 cycles per second frequency are used to trigger the starting of the horizontal oscillator's cycle. If left alone, the oscillator would function at its natural period which, more often than not, would not coincide with the incoming signal, so it has been the purpose of the intervening horizontal synchronizing pulses to bring both oscillator and signal into step. For effective control, the oscillator frequency and that of the synchronizing pulses must be close enough together to permit locking-in, which cannot be accomplished without manually effected control.

It may be explained that the natural period of a free-running oscillator may be such that its time of cut-off will not coincide with the time of maximum positive voltage of an incoming horizontal synchronization pulse to permit the pulse to properly trigger the oscillator. That is why it is necessary to bring the oscillator period and synchronizing pulse into step. This is done by regulating the operating frequency of the tube by adjustment of a grid circuit resistor which, in connection with a capacitor, determines the time period during which the grid remains so negative as to keep the tube non-conductive. The adjustable resistor, which is known as a "Hold Control," usually is adjusted to a rate just a little slower than that of the synchronizing pulses so that, when a synchronizing pulse of positive polarity is impressed on the grid circuit of the oscillator just before the instant at which conduction in the tube would have started naturally, the pulse potential is added to the grid voltage to bring it up past the cut-off value at the instant of the pulse. This starts conduction in the tube earlier than it otherwise would have occurred so that the sawtooth capacitor will now have a charging interval corresponding to the synchronizing pulses and in step therewith.

The trouble with a horizontal sweep oscillator and its hold control regulation is that oscillator drift, intermittent drift, and untimely triggering due to noise pulses develop in the oscillator circuit to throw the picture out of synchronism horizontally. Moreover, it is very difficult for the television service man to locate the cause of the trouble.

With the above-enumerated disadvantages of the horizontal sweep oscillator circuit in mind, it is my primary object to substitute a new circuit that derives its power directly from the incoming horizontal synchronizing pulses and is thus positively driven at the same frequency as the said pulses without the aid of any manual control. All necessary phase adjustments are made initially. Thereafter, the circuit will accommodate itself automatically to signal interruptions and similar disturbances.

To be more explicit, after the incoming horizontal synchronizing pulses have been received in a tuned resonant circuit, they are applied to the control grid circuit of a pentode tube in which they are amplified and converted from the square pulse form into pure sine waves. Thereafter, an adjustable transformer is employed to reverse the polarity of the sine waves for subjection to a double triode tube which further amplifies them and converts them into the ultimate sawtooth waves for horizontal deflection of the electron beam in the picture tube. This is a new method of synchronization.

Another object of the invention is to provide a horizontal sweep circuit of a nature which facilitates alignment of the several included resonant circuits in conformity to the respective time constants of the circuits of the different standard television receiver sets in which the said horizontal sweep circuit may be installed.

Numerous additional advantages are afforded by the new horizontal sweep circuit. For instance, there will be improved horizontal picture resolution or definition. The horizontal hold control of oscillator circuits is replaced by a picture centering control. The amplifier output can adjusted with ample reserve drive power for the horizontal output tube. It is made possible to use simplified circuits in the clippers or synchronizing pulse separators of the standard receivers because the amplifying means in the new sweep circuit is tuned to the horizontal synchronization frequency and will reject other signals. Adjustment of the tuned resonant circuits can produce a desirable ratio of signal to noise. The new circuit also is peculiarly adapted to use in color television receivers because resonant frequency of the tuned circuits can be changed readily with a change in horizontal synchronizing pulse frequency.

The foregoing and other objects, advantages and features of the invention will be more fully understood when the following specific description is read in connection with the accompanying drawings, in which.

Figures 1, 2, 3:
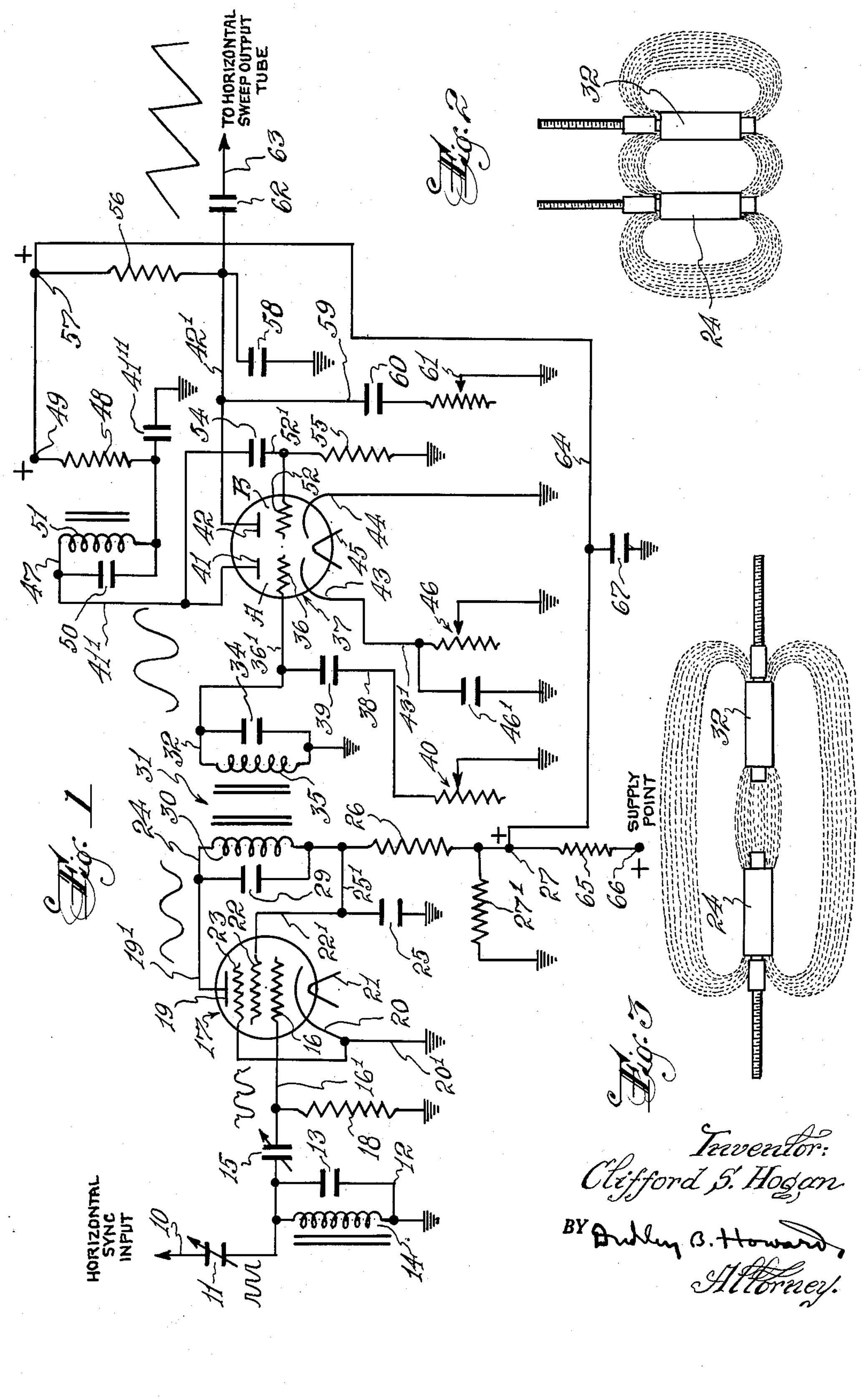
Fig. 1 is a diagram of the new horizontal sweep synchronization circuit of the present invention.
Fig. 2 is a detail elevational view of the transformer used in the circuit represented diagrammatically in Fig. 1, showing the primary and secondary elements in a side-by-side coupling arrangement.
Fig. 3 is a similar view showing the arrangement changed to end-to-end coupling for 180 degrees phase reversal.

Before describing the new horizontal sweep synchronization circuit in detail, the method of operation involved will be outlined.

It has already been stated that the circuit derives its power from the incoming sync pulses, which are usually electrostatically positive in polarity and have the required operating frequency of 15,750 cycles per second. In accordance with the present inventive concept, these pulses are to be converted, after subjection to sequential intervening form changing, amplification and phase adjustment steps, into the ultimate saw-tooth waves for the usual final amplification and application to the deflection coils of the picture tube of the receiver.

Those intervening steps commence with elimination by a blocking capacitor of any direct current component of the incoming sync pulses that may be present. Immediately thereafter, the sync pulses are subjected to the action of a high Q tuned resonant input circuit which filters out harmonics and any other undesirable signals, converts each pulse into a distorted form of alternating current sine wave, produces a strong flywheel effect at resonance, and incidentally adjusts the phase. The sync waves issuing from the input resonant circuit are then applied to the control grid circuit of an amplifying tube, preferably of the pentode type, which performs a first stage of amplification. The circuit of this tube is not self-oscillating, so, instead of being triggered into any altered timing condition by the sync waves, as in the case of the prior art horizontal oscillator, the tube is positively driven in instantaneously timed step with said waves at the original pulse frequency. Conversion of the distorted A. C. sine waves into D. C. sine form pulses of positive polarity takes place in this tube, and also there will be a phase shift through an angle of 180 degrees. It is to be understood that it is within the scope of the invention to substitute for the preferred amplifying tube some other equivalent electronic device, such as a transistor.

Before subjection to a second stage of amplification the D. C. pulsating current from the plate of the first stage amplifying tube is injected into the primary resonant tuned circuit of a magnetically coupled transformer circuit which has a similar tuned resonant circuit for its secondary. In the primary resonant circuit of this transformer, the D. C. pulses are converted into A. C. pure sine waves, which however, do not yet have the necessary amplitude for saw-tooth wave production. Strong flywheel effects are set up in both the primary and secondary resonant circuits of the transformer. By adjustment of the transformer, the phase can be reversed to effect readjustment for correction of undesired phase shifts throughout the entire horizontal sweep circuit.

A second stage of amplification of the sine waves is performed next in the amplification section of a twin triode tube, preferably, after which the waves, which now have sufficient amplitude for saw-tooth wave production, pass through a fourth tuned resonant circuit which is aligned with the other three resonant circuits to effect the final phase adjustment of the overall circuit. From this final resonant circuit, the waves are impressed on the grid circuit of the discharge section of this same twin triode tube.

The properly amplified sine waves, which are in precise step with the input horizontal sync pulses and thus have the required frequency and timing for operation of the picture tube electron beam although not the form, will control the alternate conductivity and non-conductivity of the discharge section of the twin triode tube in a manner to time the periodic charging and discharging of the usual saw-tooth capacitor so that the saw-tooth waves generated thereby will be in perfect synchronism with the input sync pulses.

The succession of flywheel effects created in the aligned network of tuned resonant circuits tend to make the horizontal sweep circuit self-oscillating as a whole. Consequently, there will be no undesirable cessation of motion of the electron beam of the picture tube when interruptions of brief duration in the video signal occur. This cumulative effect of the successive resonant circuits makes up for the lack of the usual horizontal oscillator, which heretofore has been considered indispensable because its beam-operating oscillations have been persistent, although likely to be out of proper synchronism with the corresponding transmitter scanning beam, whenever an interruption of the video signal occurred.

The new horizontal sweep synchronization method can be performed successfully with the circuit represented diagrammatically in Fig. 1 of the drawings, but it is within the scope of the invention to make suitable variations in the structural elements of the circuit and their relative arrangement such as come within the province of a technician skilled in the art. It will be observed that this circuit does not include any parts of the standard television receiver in which installed other than the horizontal sync pulse input circuit leading from the usual clipper and the sawtooth capacitor and its output circuit which leads to the usual picture tube amplifier. This is because my invention resides only in the area of the horizontal sweep circuit.

Referring now in detail to Fig. 1, the numeral 10 designates the horizontal sync pulse input circuit which leads from the clipper or equivalent means (not shown) of the standard receiver circuits for separating the horizontal sync pulses from the video signal. Circuit 10 is connected to ground through a variable blocking capacitor 11 and tuned high Q input resonant circuit 12, which latter contains parallel connected capacitor 13 and adjustable inductance 14.

At this juncture, it may be explained that the term "ground" is intended to mean either that which it implies or some metallic conductor such as the chassis of the receiving set or of the new circuit itself when manufactured as an integral unit with metallic shielding cans and the like. Similarly, the term "common D. C. source" used hereinafter means either a battery circuit or the usually available, and preferred, direct current supply circuit for power and light. The separately mentioned "terminals" may be either wall outlets or terminal connectors on a voltage divider circuit.

Blocking capacitor 11 serves to eliminate any direct current component which may be present in the incoming sync signal.

Tuned input resonant circuit 12 is intended to serve several purposes. Of primary importance, it receives and converts the incoming horizontal sync pulses into alternating current sine waves which are distorted in form although some of the harmonics and other undesirable signals present at input will have been filtered out. Another very important function of this resonant circuit is to set up a flywheel effect at resonance, which will be quite strong due to the high Q value of the circuit. A phase shift necessarily will occur, but it will be only one of a series of phase shifts during progress of the respective pulses or waves through the entire sweep circuit, all of which can be corrected for very readily in advance of the saw-tooth capacitor by means to be described later herein.

Since the flywheel effect produced in the input resonant circuit plays such an important role in the new method, this circuit should have as high a Q value as practicable. In tests toward that end, it has been found that best results can be obtained with use of a 2500 to 3000 mmf.—600 volts silver mica capacitor (varies with type of receiver set) and a variable inductance such as a GE RLD–019-width inductance coil with powdered iron core slug having a variable inductance of 6.4 to 40 mh. at 1000 cycles per second.

In input resonant circuit 12, capacitor 13 discharges into inductance 14 and the inductance discharges back into the capacitor when a resonant signal is applied. There will be no reactance between capacitor and inductance, so a distorted form of A. C. sine wave is produced. It has been found that in this high Q tuned circuit a strong magnetic field is created, so shielding is desirable to reduce stray field pick-up. This shielding will reduce the Q value somewhat, but not enough to seriously affect the function to be performed.

The capacitor branch of resonant input circuit 12 is connected through a second variable blocking capacitor 15 to control grid 16 of pentode tube 17 which furnishes the first stage of amplification of the distorted sine waves emitted by resonant circuit 12. The circuit 16' of control grid 16 is grounded through voltage biasing grid leak resistor 18.

Pentode tube 17 has, in addition to control grid 16, the usual anode, or plate, 19; a cathode 20 heated by filament 21; a screen grid 22; and a suppressor grid 23. The plate circuit 19' of tube 17 consists of resonant circuit 24, by-pass to ground capacitor 25 with its circuit branch 25', and voltage-dropping resistor 26 which derives plate voltage of required potential from terminal 27 of a common D. C. source. A bleeder connection to ground through a resistor 27' is installed at the location of terminal 27 to help stabilize the plate voltage.

Screen grid 22 is connected by screen grid circuit 22' to branch 25' of plate circuit 19'. As a result, both plate and screen grid will be impressed with positive D. C. voltage as is usual in the operation of a pentode tube as an amplifier. Cathode 20 is connected to ground by cathode circuit 20' because it is necessary that all cathodes in the over-all sweep circuit be considered at ground potential in relation to the 15,750 cycles per second voltage so that grid voltages will be considered at high potential with respect to the cathode. Suppressor grid 23 is connected directly to cathode circuit 20' and thus will also be negative in polarity.

Tube 17 operates in characteristic manner to amplify the synchronized distorted sine waves applied to control grid 16 with the aid of grid leak resistor 28 which biases the negative voltage impressed on said grid downward sufficiently to prevent addition of space charge voltage which otherwise would undesirably impede flow of electrons from cathode 20 to plate 19.

The voltage gain of the first amplification stage contributed by pentode tube 17 is injected into resonant circuit 24 which, like input resonant circuit 12, is of high Q value. This circuit contains parallel connected capacitor 29 and adjustable inductance 30, by which latter the circuit is tuned. The characteristics of the elements of resonant circuit 24 are the same as those that comprise input resonant circuit 12 so that substantially equal Q value, flywheel effect and phase shift will result. In addition to being included in plate circuit 19' of tube 17, resonant circuit 24 also forms part of the coupled circuit of transformer 31 in the relation of primary element. Primary resonant circuit 24 is magnetically inductively coupled to the secondary element of the transformer, which is constituted by a third tuned high Q resonant circuit 32.

Secondary resonant circuit 32 of transformer 31 contains parallel connected capacitor 34 and adjustable inductance 35, and, as in resonant circuits 12 and 24, the characteristics of the element in said circuit 32 are chosen to afford the same high Q value, flywheel effect, and phase shift.

Since amplifier tube 17 will inherently introduce a phase shift of 180 degrees in the pulsating D. C. current which is delivered to primary resonant circuit 24 of transformer 31, the latter has been constructed in its physical embodiment illustrated in Figs. 2 and 3 so that a manually accomplished reversal of phase may be obtained by simply changing the angular arrangement of the primary and secondary transformer elements 24 and 32. When the two transformer elements are changed from the side-by-side arrangement of Fig. 2 to the end-to-end arrangement of Fig. 3, the desired phase reversal through 180 degrees will result.

The inductive branch of secondary resonant circuit 32 is connected to ground as required and the capacitive branch is connected to the control grid 36 of twin triode tube 37 by grid circuit 36'. Further details of this tube and its functions will be described presently.

A phase shifting circuit 38 is connected in parallel with resonant circuit 32 through part of grid circuit 36' and includes series connected capacitor 39 and variable-resistance potentiometer 40. This circuit is provided for convenience in picture centering control by manual operation of an externally located knob (not shown) on the receiving set, although this control could be exerted in a less convenient manner by adjusting the slug of inductance 35 of resonant circuit 32. Actually, picture centering can be effected by similar adjustment of inductive reactance in any of the other resonant circuits. The lead wire of circuit 38 should be dressed to eliminate any stray field pick-up.

Twin triode tube 37 has been selected for use in amplifying the pulsating D. C. sine waves impressed on its control grid 36 because a tube of this kind is also capable of timing the charging and discharging of the saw-tooth capacitor which constitutes the final element of the new horizontal sweep circuit. This tube comprises an amplifying section A (at the left side) and a discharge section B (right side). Sections A and B have plates 41 and 42, respectively, and cathodes 43 and 44, respectively. Both cathodes are heated by a common filament 45.

Grid bias for amplifying section A of tube 37 is produced by the use of an adjustable resistor 46 in the cathode-to-ground circuit 43'. Adjustable resistor 46 is by-passed to ground through capacitor 46'. Plate 41 of amplifying section A is connected to a fourth tuned resonant circuit 47, this circuit being the final amplifying stage of the sine wave. The necessary D. C. plate voltage is obtained for plate 41 via plate circuit 41' through voltage-dropping resistor 48 from terminal 49 of the common D. C. source. Plate resonant circuit 47 is by-passed to ground through capacitor 41''.

Referring again to the grid biasing means for amplifying section A of tube 37, it may be stated that adjustable resistor 46 provides means for phase shifting and also may serve as a gain control. This gain control provision is especially desirable when the receiving set in which the new horizontal sweep circuit is installed does not have any kind of automatic gain control circuit.

Resonant circuit 47 is a high Q tuned circuit just like resonant circuits 12, 24 and 32 and contains parallel connected capacitor 50 and inductance 51, the characteristics of which insure the same effects on the sine waves, including flywheel effect, as in the other resonant circuits.

Amplified voltage from resonant plate circuit 41' is capacitively coupled to grid 52 of discharge section B of tube 37 through grid circuit 52' and capacitor 54. Grid 52 is connected to ground through voltage biasing grid leak resistor 55.

The necessary D. C. plate voltage is obtained for plate 42 via plate circuit 42' through voltage-dropping resistor 56 from terminal 52 of the common D. C. source. Capacitor 58 functions as a supplementary discharge capacitor similar in manner to saw-tooth capacitor 60 and in parallel thereto, but is not adjustable.

At a point between voltage-dropping resistor 56 and plate 42 of discharge section B of tube 37, plate circuit 42' is connected by branch circuit 59 to ground through saw-tooth capacitor 60 and variable potentiometer 61 which functions as a drive, or peaking resistor. At a point between voltage-dropping resistor and branch circuit 59, plate circuit 42' is connected through capacitor 62 to the horizontal sweep output tube circuit 63.

The sine waves that are applied to grid 52 of discharge section B of tube 37 will be of proper amplitude for production of saw-tooth waves for supply through capacitor 62 and circuit 63 to the horizontal sweep output tube (not shown). The action of discharge section B will now be described.

Each time tube section B becomes conductive, saw-tooth capacitor 60 has to discharge through the series resistor 61. The rate of discharge is slowed down by the resistor, which rate depends upon the time constant of the saw-tooth capacitor and its series resistor. The sine wave voltage impressed on grid 52 of discharge section B of the tube is of sufficient amplitude to cause the grid to go sufficiently positive to cause the discharge section to become conductive and there will be an instantaneous drop of voltage because the plate-cathode resistance of the tube becomes nearly zero when the grid is made positive by the incoming sine waveform. This causes discharge capacitor 60 to discharge through the tube and thus produce the saw-tooth waveform.

In order to equalize the potential at the respective D. C. terminals, a plate supply bus bar 64 which includes said terminals is connected through isolation resistor 65 to input supply point 66, which latter has direct connection with an outside source of voltage preferably of the order of 300 volts. Bus bar 64 is grounded through capacitor 67 to eliminate any D. C. ripple.

When constructing the new circuit, all wiring connections should be made as short as possible and kept properly separated to avoid feedback. Moreover, each resonant circuit should be shielded from the others by use of shielded cans, except that inductively coupled resonant circuits 24 and 32 should be contained in one can.

Each of the four variable resonant circuits must have a high potential and a low potential side. To insure this condition, resonant circuits 12 and 32 are directly connected to ground, whereas resonant circuits 24 and 47 obtain ground potential by use of capacitive ground connections.

The improved horizontal sweep circuit of the present invention is very flexible in its means for adjustment to the conditions existing in a receiving set in which it has been installed. Initial phase drift correction in the relation of the horizontal sync pulses with the saw-tooth voltages for the deflection coils of the picture tube is accomplished by first adjusting the tuning slugs of all resonant circuits in the aligned network. Whenever the phase drift in advance of magnetically coupled transformer 31 and also between the latter and discharge section B of twin triode tube 37 have been corrected to the point where the primary and secondary resonant circuits of the transformer are found to be 180 degrees out of phase, all that remains to be done is to reverse the phase by changing the arrangement of the primary and secondary transformer elements from the side-by-side arrangement shown in Fig. 2 to the end-to-end arrangement shown in Fig. 3, or vice versa, as the case may be. After the receiver housing has been closed, any further phase adjustment which may be necessary can be effected by exterior manual adjustment of variable-resistance potentiometer 40. This control also constitutes particularly handy means for picture centering. The phase corrected condition of the circuit is positive and relatively permanent. Substitution of the new circuit for the previously used horizontal oscillator has removed the cause of picture screen defects such as horizontal and sloping bars.

It will be understood that it is intended to cover all changes and modifications of the example of the invention herein chosen for the purpose of illustration which do not constitute departures from the spirit and scope of the invention.

Having thus described the invention, I claim:

1. In a television receiver having an input circuit for horizontal synchronizing pulses and a saw-tooth capacitor and related peaking resistor, a horizontal sweep synchronization circuit comprising: a non-oscillating amplifying tube having its control grid circuit connected to the synchronizing pulses input circuit and adapted to create pure sine waves of pulsating direct current of partially amplified form in its plate circuit; an inductively coupled transformer comprising a primary tuned resonant circuit and a secondary tuned resonant circuit wherein the primary circuit is connected to the plate circuit of said amplifying tube, said transformer being capable of 180 degrees phase adjustment; a second amplifying tube means having its control grid connected to the secondary resonant circuit of said transformer; a third tuned resonant circuit connected to the plate circuit of said second amplifying tube means; a discharge tube means having its control grid circuit connected to the plate circuit of said second amplifying tube means and its plate circuit connected to the saw-tooth capacitor; means to supply direct current at proper voltage to the plate circuits of both tubes; and means to give ground potential to the cathode circuits of both tubes.

2. The invention as defined in claim 1, wherein each tuned resonant circuit contains a capacitor and an adjustable inductance in parallel with said capacitor.

3. The invention as defined in claim 1, wherein each tuned resonant circuit is of such characteristics that a strong flywheel effect will be produced therein at resonance.

4. The invention as defined in claim 3, wherein each tuned resonant circuit is of high Q value.

5. The invention as defined in claim 1, wherein the second amplifying tube means and discharge tube means are constiuted by the amplifying and discharge sections of a twin triode tube.

6. The invention as defined in claim 1, wherein means is included in each tuned resonant circuit for phase adjustment.

7. In a television receiver having an input circuit for horizontal synchronizing pulses after separation thereof from the video signal and a horizontal sweep output circuit, a horizontal sweep synchronization circuit interconnecting said input and output circuits to utilize the horizontal synchronizing pulses to drive the saw-tooth wave production means for said horizontal sweep output circuit at the fundamental frequency of said pulses, said horizontal sweep synchronization circuit comprising: an input tuned circuit resonant to the horizontal synchronizing frequency connected to said input circuit for horizontal synchronizing pulses to change the incoming synchronizing pulses from characteristic square form into distorted sine waves of the frame frequency; a first stage non-oscillating electronic amplifier resonant to the horizontal synchronization frequency and having its input connected to said input tuned resonant circuit; an inductively coupled transformer comprising a primary tuned circuit resonant to the horizontal synchronizing frequency connected to the output of said first stage electronic amplifier and a secondary tuned circuit resonant to the horizontal synchronizing frequency, said transformer being adapted to change the distorted sine waves emanating from the first stage electronic amplifier into substantially pure sine waves; a second stage electronic amplifier having its input connected to the secondary tuned resonant circuit of said transformer; a fourth tuned circuit resonant to the horizontal, synchronizing frequency connected to the output of said second stage electronic amplifier; saw-tooth wave production means constituted by a circuit connected to the horizontal sweep output circuit and including a saw-tooth capacitor and related peaking resistor; and an electronic discharge device having its output connected to the circuit of said saw-tooth wave production means in a manner to time the periodic charging and discharging of its capacitor and having its input connected to said fourth tuned resonant circuit to receive the sine wave voltage developed across said resonant circuit.

8. The invention defined in claim 7, wherein all four tuned resonant circuits are of high Q value and whose overall response curve will be the frequency of the horizontal synchronizing pulses.

9. The invention defined in claim 7, wherein the first stage electronic amplifier operates at radio frequency and has its individual circuits tuned to the frequency of the horizontal synchronizing pulses.

10. The invention defined in claim 7, wherein the inductively coupled primary and secondary resonant circuits of the transformer are capable of 180 degrees phase reversal for phase adjustment control.

11. The invention as defined in claim 4, wherein a tuned resonant circuit resonant to the horizontal synchronizing frequency is interposed between the synchronizing pulse input circuit and the control grid circuit of the non-oscillating amplifying tube.

12. The invention as defined in claim 11, wherein each tuned resonant circuit contains a capacitor and an adjustable inductance in parallel with said capacitor.

13. The invention as defined in claim 11, wherein each tuned resonant circuit is of high Q value.

14. The invention as defined in claim 11, wherein the second amplifying tube means and discharge tube means are constituted by the amplifying and discharge sections of a twin triode tube.

References Cited in the file of this patent

UNITED STATES PATENTS 2,585,930 Gruen ---------------- Feb. 19, 1952